Figure 5:
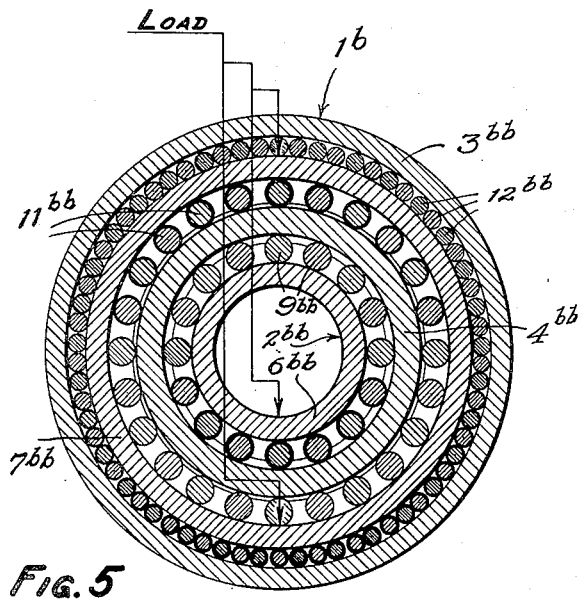

Nov. 22, 1949 V. PALUMBO 2,488,929
ANTIFRICTION BEARING OF THE ANGLE TYPE
Filed Oct. 22, 1945 2 Sheets-Sheet 1
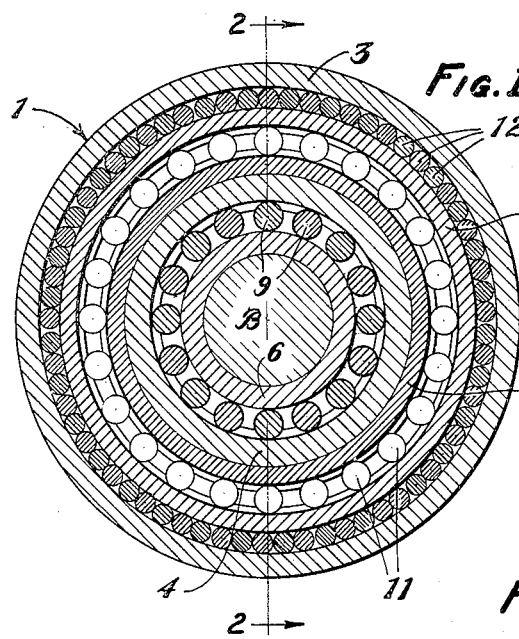
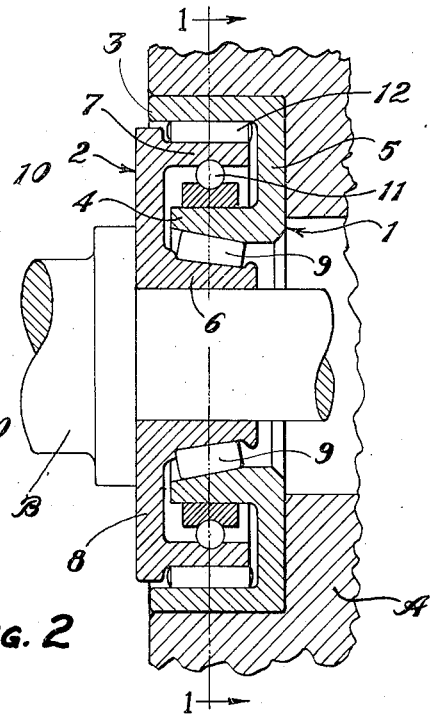
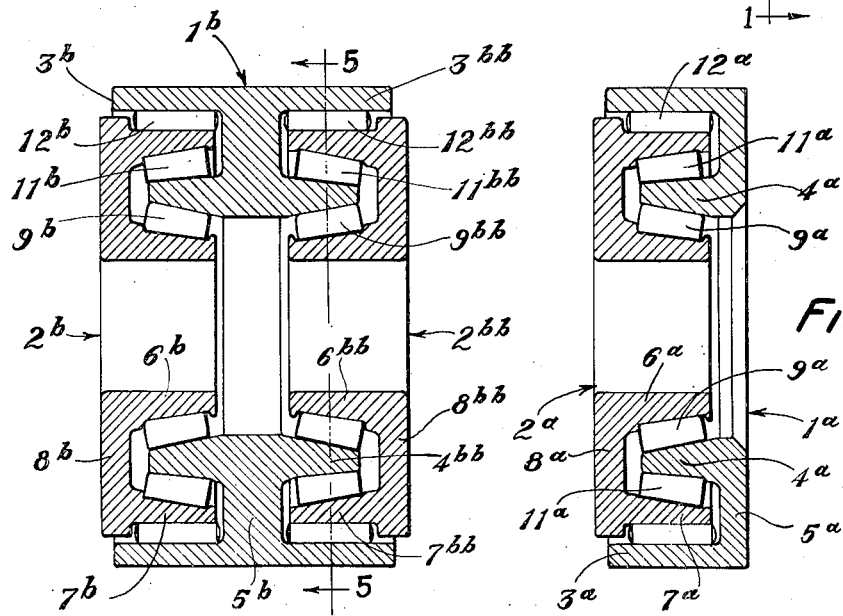
INVENTOR.
Vincent Palumbo
BY
Hull & West
ATTYS.

Nov. 22, 1949 V. PALUMBO 2,488,929
ANTIFRICTION BEARING OF THE ANGLE TYPE
Filed Oct. 22, 1945 2 Sheets-Sheet 2

INVENTOR.
Vincent Palumbo
BY
ATTYS.

Patented Nov. 22, 1949

2,488,929

UNITED STATES PATENT OFFICE 2,488,929

ANTIFRICTION BEARING OF THE ANGLE TYPE

Vincent Palumbo, Cleveland Heights, Ohio

Application October 22, 1945, Serial No. 623,624

3 Claims. (Cl. 308—183)

My invention relates to improvements in antifriction bearings of the angle type or class—that is to say, of the kind or class in which both radial load and end thrust are sustained by the same rotating bearing elements. A simple example is a ballbearing having a conical race.

This application is a companion to one titled "Anti-friction bearing of the radial type," filed October 22, 1945, Serial No. 623,625. While the bearings that form the subject matter of the two applications are different in type—one being radial and the other angle—they embody a common principle in that the load in each case is distributed substantially throughout the entire circumference of the bearing.

The main object of the present invention is to provide an anti-friction bearing of the angle type or class incorporating this principle.

Other and more general objects are to provide a construction that makes manufacture of its parts by prevailing methods easy and inexpensive; that facilitates assembly, and that increases the life and efficiency of bearings of the class aforesaid.

The foregoing objects and advantages, with others that are self evident from the following description, are attained in the embodiments of the invention illustrated in the accompanying drawings, wherein like reference characters designate corresponding parts throughout the several views.

In the drawings, Fig. 1 represents a transverse section through a bearing incorporating my improvements, the plane of section being indicated by the line 1—1 of Fig. 2; Fig. 2 is a section on the line 2—2 of Fig. 1, the present view including a fragment of a support for the non-rotating member of the bearing, and a portion of a shaft that is sustained by the rotating member thereof; Fig. 3 is a sectional view showing a modification of the invention; Fig. 4 is a similar view of a double bearing embodying the same modified form of the invention as that shown in Fig. 3; Fig. 5 is a section on the line 5—5 of Fig. 4.

My improved angle bearing, in the form illustrated in Figs. 1 and 2, comprises members designated, generally, by the reference numerals 1 and 2, the former, according to the installation illustrated in Fig. 2, being the non-rotating member since it is fitted into a recess of a stationary support A, which may be the frame or housing of a machine, while the latter, in the present example, is the rotating member and supports a shaft B. The member 1 comprises a peripheral wall 3, shown as cylindrical, an annular flange 4 that is spaced inwardly from and is concentric with the wall 3, and an annular radial wall 5 that connects the adjacent ends of the wall 3 and flange 4. The member 2 consists of inner and outer cylindrical walls 6 and 7, respectively, that are concentric with the axis of the bearing and are connected together by an annular radial wall 8, said walls 6 to 8 defining a channel in the member 2 into which extends the flange 4 of the member 1.

The outer side of the wall 6 and the opposed surface of the flange 4 are frusto conical and are disposed at a slight angle with respect to each other, the projected sides of which angle intersect on the axis of the bearing, as in conventional tapered bearings. Interposed between the wall 6 and flange 4 are a row of correspondingly tapered rollers 9. Surrounding the flange 4 and capable of sliding thereon is a ring 10 between which and the wall 7 of the member 2 is a row of rotating bearing elements or balls 11, the opposed surfaces of said ring and flange being grooved to provide races for said elements or balls. Interposed between the outer side of the wall 7 and the inner side of the wall 3 is a row of rotating bearing elements or rollers 12.

It is evident from the construction above described that the load, consisting in most part of the weight of the shaft B, bears, in part, on those rollers 9 that are beneath the lower half of the wall 6, and, through said rollers, on the underlying part of the flange 4. A further substantial part of the load, communicated thereto through the walls 8 and 7 of the member 2, bears on the elements or balls 11 that are beneath the upper half of the wall 7 and, through them and the ring 10, on the remaining part of the flange 4. In other words, the portion of the load so far considered is distributed substantially throughout the circumference of said flange 4. The remainder of the load is imposed on the rollers 12 that are distributed about the lower half of the bearing.

By reason of the angular disposition of the rollers 9—which are tapered to eliminate friction, as understood by those skilled in the art—said rollers sustain end thrust, as well as a good percentage of the radial load, the latter load being taken also by the rotating bearing elements 11 and 12. Because the elements 12 consist of cylindrical rollers, and the ring 10 is slidable on the flange 4 and will therefore follow any movement in an axial direction of the elements or balls 11, the members 1 and 2 may be adjusted axially toward each other to take up any wear of the tapered rollers 9 or the surfaces wherewith they cooperate.

In describing the modifications of the invention illustrated, successively, in Figs. 3 to 10, I shall designate the parts thereof by the same reference numerals that are applied to the corresponding parts of the first described form, adding thereto, in each instance, a different exponent.

In the construction illustrated in Fig. 3, the bearing member $1^a$, which comprises the peripheral wall $3^a$, the flange $4^a$, and the annular radial wall $5^a$, is distinguished from the corresponding member of the previously described form by the inclination of the outer surface of the flange $4^a$ to render it suitable for cooperation with the outer row of tapered rollers $11^a$. The taper of these rollers also necessitates a similar change of the inner surface of the outer wall $7^a$ of the bearing member $2^a$ wherewith said rollers engage. The remaining parts of the member $2^a$, to wit, the annular radial wall $8^a$ and the inner cylindrical wall $6^a$, are the same as in the first described form, and a row of tapered rollers $9^a$ operate between the opposed surfaces of the wall $6^a$ and the flange $4^a$. Traversing the races constituted of the inner surface of the wall $3^a$ and the outer surface of the wall $7^a$ are cylindrical rollers $12^a$ which are capable of moving laterally of said races upon axial adjustment of the members $1^a$ and $2^a$ to compensate for wear of the rollers $9^a$ and $11^a$ and the surfaces of said members wherewith they engage.

Fig. 4 illustrates a double bearing which, in other respects, is identical with the construction just described. The parts of the bearing member $1^b$ are duplicated on both sides of a central annular body $5^b$, and the reference characters applying to said parts on one side of said body include a single exponent, while those applied to the parts on the other side are characterized by a double exponent. This same system is employed in connection with the duplicated bearing members $2^b$ and $2^{bb}$.

The distribution of the load in the double bearing of Fig. 4, as well as in the single bearing of Fig. 3, is clearly illustrated in the somewhat diagrammatic section that constitutes Fig. 5, the plane of which section is indicated by the line 5—5 of Fig. 4. In this view, the loaded rotating bearing elements or rollers are shown in heavy outline to distinguish them from the unloaded elements or rollers that are shown in light lines.

As mentioned in my companion application hereinbefore identified by serial number, rings or cages may be employed in accordance with common practice for maintaining the rotating bearing elements of the respective rows, whether they be balls or rollers, properly spaced circumferentially of the bearing.

Having thus described my invention, what I claim is:

1. An anti-friction bearing comprising a member consisting of a radial wall having a central opening, an annular flange extending in an axial direction from each side of said wall and being concentric with the axis of the bearing, opposed bearing members each having a side opening channel into which one of said flanges of the first mentioned member extends, a row of rotating bearing elements between each side of each flange and the opposed wall of the corresponding channel, the peripheral surfaces of the second mentioned members constituting races, the first mentioned member having parts overlying said peripheral surfaces of the second mentioned members and providing races in opposed relation to those first mentioned, and rows of rotating bearing elements operating between said races.

2. An anti-friction bearing comprising a member consisting of a radial wall having a central opening, an annular flange extending in an axial direction from each side of said wall and being concentric with the axis of the bearing, opposed bearing members each having a side opening channel into which one of said flanges of the first mentioned member extends, and a row of rotating bearing elements between each side of each flange and the opposed wall of the corresponding channel, the bearing elements of at least one row consisting of tapered rollers, and the surfaces of the bearing members wherewith they cooperate being correspondingly shaped, the peripheral surfaces of the second mentioned members constituting races, the first mentioned member having parts overlying said peripheral surfaces of the second mentioned members and providing races in opposed relation to those first mentioned, and rows of rotating bearing elements operating between said races.

3. An anti-friction bearing comprising a member consisting of a radial wall having a central opening, an annular flange extending in an axial direction from said wall and being concentric with the axis of the bearing, a second member having a side opening channel into which said flange extends, a row of rotating bearing elements between each side of said flange and the opposed wall of the channel, the peripheral surface of the second member constituting a race, the first mentioned member having a part overlying said peripheral surface of the second member and providing a race in opposed relation to the first mentioned race, and a row of rotating bearing elements operating between said races, some of the aforesaid bearing elements and the surfaces wherewith they cooperate being shaped to produce an angle bearing.

VINCENT PALUMBO.

REFERENCES CITED

The following references are of record in the file of this patent:

UNITED STATES PATENTS

| Number | Name | Date |
|---|---|---|
| 293,619 | Bishop | Feb. 19, 1884 |
| 434,480 | Simonds | Aug. 19, 1890 |
| 633,053 | St. Louis | Sept. 12, 1899 |
| 945,806 | Rhodes | Jan. 11, 1910 |
| 1,008,643 | Hess | Nov. 14, 1911 |
| 1,181,407 | Ringland | May 2, 1916 |
| 1,800,564 | O'Connor | Apr. 14, 1931 |
| 1,804,600 | Edson | May 12, 1931 |
| 1,971,782 | Herrmann | Aug. 28, 1934 |

FOREIGN PATENTS

| Number | Country | Date |
|---|---|---|
| 210,527 | Germany | June 1, 1909 |